Feb. 20, 1962 C. J. VOTAW 3,022,372
STATION SELECTION SYSTEM
Filed Nov. 24, 1958
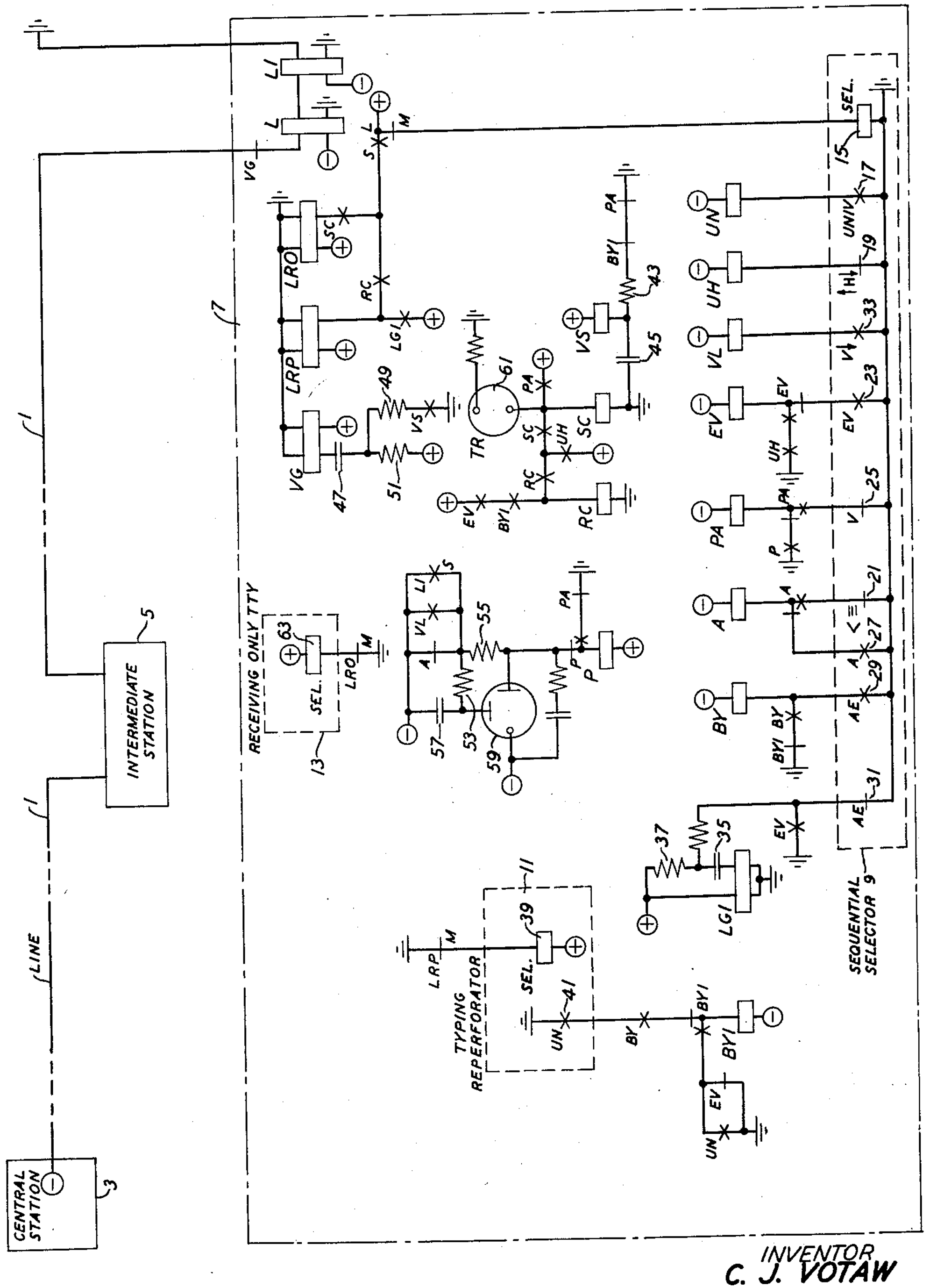
INVENTOR
C. J. VOTAW
BY
John E Cassidy
ATTORNEY United States Patent Office 3,022,372

Patented Feb. 20, 1962

3,022,372

STATION SELECTION SYSTEM

Clarence J. Votaw, Bergenfield, N.J., assignor to Bell Telephone Laboratories, Incorporated, New York, N.Y., a corporation of New York Filed Nov. 24, 1958, Ser. No. 776,039
9 Claims. (Cl. 178—4.1)

This invention relates to an automatic telegraph selection system and more particularly to a system for selecting remote recorders on a half duplex multistation line.

A broad object of this invention is to provide an improved system for selecting stations on a multistation line.

In the copending application of A. W. Kaufman et al., Serial No. 650,889, filed April 5, 1957, which issued on November 10, 1959 as Patent 2,912,485, there is disclosed a system of the type wherein a central station sequentially polls outlying stations on a multistation line for available message material. In the event that an outlying station is supplied with message material when polled by the central station, it begins sending address or call directing code sequences corresponding to the desired station or stations of destination. Each of the call directing code sequences also designates whether or not an answerback response is expected from the called station. After the sending station sends a call directing code sequence requiring answerback, it automatically stops and awaits the answerback response from the called station before resuming transmission. In a preferred embodiment, the present invention is arranged to cooperate with the system disclosed in the above-mentioned Kaufman application.

A further object of this invention is to provide assurance that the called station receiver is functioning before sending the answerback response.

Another object of this invention is to delay the selection of the called station receiver until the answerback response is transmitted.

Another object of this invention is to intercept messages in the absence of an acknowledgment to call directing codes requiring answerback.

An additional object of this invention is to provide an answerback response when a message is intercepted.

In accordance with the preferred embodiment of the present invention, the called station circuitry is arranged to respond to the call directing code sequence individual thereto by applying a signal to the station recorder, thereby momentarily releasing the recorder for a single rotation. The station circuitry then transmits an answerback signal in response to the momentary operation of the recorder and, upon sensing the transmission of the answerback signal, associates the recorder with the multistation line. One or more stations are provided with an intercept circuit for recording messages when a call directing code sequence requiring answerback is not acknowledged. The intercept circuit includes a timing circuit whose operation is initiated by the impression of a call directing code sequence requiring answerback on the multistation line. In the event that the sequence is not acknowledged, the timing circuit times out whereupon the intercept circuit impresses the answerback signal on the line and unblinds an intercept recorder.

The means for fulfilling the foregoing objects and the practical embodiment of the features of this invention will be fully understood from the following description taken in conjunction with the accompanying drawing.

In the drawing, the relay contacts are shown detached from the relay windings. The relay winding is given a letter designation and the contacts associated with the relay winding are given the same letter designation. Contacts which are closed when the relay is de-energized, known as "break contacts," are represented by a single short line perpendicular to the conductor line, while contacts which are closed when the relay is energized, known as "make contacts," are represented by two short, crossed lines diagonally intercepting the conductor line.

Referring now to the drawing, a typical half-duplex party line 1 is shown extending from a central station, generally indicated by block 3. Party line 1 has been shown in the drawing as a metallic transmission circuit. It is to be understood, however, that this line may include any of the usual types of transmission channels suitable for the transmission of telegraph signals.

Party line 1 is shown extending to two outlying stations designated 5 and 7 but may actually extend to any number of outlying stations. Each of the outlying stations may be provided with a transmitter-distributor and a transmitter control circuit, not shown, which functions to start the associated transmitter-distributor, if it is supplied with message material, when polled by the central station. The transmitter control circuit also functions to stop the transmitter-distributor after the transmission of each address or call directing code sequence requiring answerback and restart the transmitter-distributor upon receipt of the answerback signal. The transmitter control circuit is preferably of the type disclosed in the above-mentioned copending Kaufman et al. application. Each of the call directing code sequences preferably comprise two teletypewriter code characters, wherein the first character of each sequence requiring answerback is, invariably, the code character A.

Each of the outlying stations may also be provided with sequential selector, sometimes called a stunt box, 9 and typing reperforator 11. One or more of the outlying stations may also be designated master stations and provided with a receiving-only teletypewriter 13 for intercepting messages. A sequential selector, a receiving-only teletypewriter and a typing reperforator suitable for use in this system are described in detail in Patent No. 2,568,264 issued September 18, 1951 to W. J. Zenner, Patent No. 2,505,729 issued April 25, 1950 to W. J. Zenner, and Patent No. 2,255,794 issued to R. A. Lake on September 16, 1941, respectively. The disclosures of these patents are hereby incorporated herein by reference as though fully set forth herein.

At outlying station 7, in series with party line 1, are a break contact of relay VG and the windings of polarized line relays L and L1. Relays L and L1 follow the telegraph signals impressed on party line 1. When party line 1 is in the marking condition, a path is traced from positive battery via the marking break contact of relay L and the winding of select magnet 15 of sequential selector 9 to ground. Select magnet 15 also follows the telegraph signals on party line 1. Sequential selector 9 is placed in the select condition in response to the end-of-message code sequence Figures-H-Letters and in the nonselect condition in response to the end-of-address code sequence Carriage Return-Line Feed.

Sequential selector 9 includes normally open contacts 17 which momentarily close in response to the reception of each teletypewriter character, normally closed contacts 19 which momentarily open in response to the code sequence Figures-H-Letters and normally closed contacts 21 which open in response to the code sequence Carriage Return-Line Feed. While sequential selector 9 is in the select condition, normally open contacts 23 momentarily close in response to the code sequence EV, normally closed contacts 25 momentarily open in response to the code character V, normally open contacts 27 momentarily close in response to the code character A and normally open contacts 29 momentarily close in response to the code sequence AE. In addition, while sequential selector 9 is in the select condition, normally closed contacts 31 open in response to the code sequence AE and reclose in response to the next successive code character and normally open contacts 33 close in response to the code character V and reopen in response to the next successive code character which is not the character Letters.

Any station provided with a transmitter-distributor may address a message to one or more reperforators, including reperforator 11, by preceding the message with the proper call directing code sequences. Reperforator 11 may be selected, for example, by the sequence AE. The control circuit of station 7, in response to the sequence AE tests to see if reperforator 11 is operating properly. If reperforator 11 functions properly, station 7 sends the answerback code character V and connects reperforator 11 to party line 1.

Assuming a transmitter has just concluded a message by sending the end-of-message code sequence Figures-H-Letters, sequential selector 9 responds by placing itself in the select condition. Central station 3 now proceeds to start the next transmitter-distributor at some outlying station. In turn the transmitting distributor sends the calls directing code sequence AE to select reperforator 11.

In response to the call directing code sequence AE contacts 29 of sequential selector 9 momentarily close completing an operating path for relay BY which locks to ground by way of its own make contact and the break contact of relay BY1. In addition, in response to the code sequence AE, contacts 31 open removing ground applied to the upper plate of capacitor 35, as shown in the drawing. Charging current then flows from positive battery through resistor 37, capacitor 35 and the right-hand winding of relay LG1 to ground. Relay LG1 is adjusted to operate in response to the charging current via capacitor 35 for an interval equal to the duration of one selective code element.

Relay LG1 while operated completes a path from ground through the winding of polar relay LRP and the make contact of relay LG1 to positive battery operating relay LRP. Relay LRP, when operated, opens the energizing path for select magnet 39 of reperforator 11, via the marking break contact of relay LRP for the duration of one selective code element. This simulates the application of a Letters character to select magnet 39 releasing reperforator 11 for a single rotation.

During the above-described operation of reperforator 11, universal contacts 41 momentarily close completing a path from ground through contacts 41, make contact of relay BY, break contact of relay BY1 and the winding of relay BY1 to negative battery. Relay BY1 operates and locks from battery through its own make contact and the break contact of relay EV to ground. Relay BY1 operated opens the previously described locking path for relay BY and relay BY releases. In addition, relay BY1 removes ground applied to the winding of normally operated relay VS by way of the break contact of relay PA, the break contact of relay BY1 and resistor 43. Relay VS is slow to release due to shunting capacitor 45 and upon releasing removes ground from the lower plate of capacitor 47 applied by way of the make contact of relay VS and resistor 49. Charging current now flows from positive battery by way of resistor 51, capacitor 47 and the winding of relay VG to ground. Relay VG is adjusted to operate, due to the charging current by way of capacitor 47, for an interval equal to the duration of two selective code elements and open party line 1 for this period thereby simulating the code character V on party line 1.

Contacts 17 momentarily close in response to the impression of the character V on party line 1 momentarily operating relay UN. Relay UN while operated completes an additional holding path for relay BY1 through make contact of relay UN which shunts the break contact of relay EV, thereby holding relay BY1 operated. As the character impressed upon party line 1 previous to the impressing of the code character V was the code character E of the call directing code sequence, contacts 23 of sequential selector 9 momentarily close completing a path from ground through contacts 23, break contact of relay EV and the winding of relay EV to battery operating relay EV which locks by way of its own make contact and the make contact of normally operated relay UH. The impression of the character V on party line 1 also acts to reclose contacts 31 thereby recompleting the discharge path for capacitor 35.

Relay EV operates to complete a path from ground through the winding of relay RC, the make contact of relay BY1 and the make contact of relay EV to battery operating relay RC which locks from ground through its winding and its own make contact and the make contact of normally operated relay UH to battery. Relay EV also completes an additional discharge path for capacitor 35. Relay RC operated extends a path from battery through the spacing make contact of relay L, the make contact of relay RC, and the right-hand winding of relay LRP to ground operating relay LRP in response to each spacing signal. Relay LRP and reperforator 11 therefore follow the telegraph signals impressed on line 1.

The subsequent reopening of contacts 17 releases relay UN. With relay UN released and relay EV operated, the locking and holding paths for relay BY1 are open and the relay releases. The release of relay BY1 restores the previously described operating path for relay VS and relay VS reoperates to recomplete the previously described discharge path of capacitor 47.

At the conclusion of the message, contacts 19 momentarily open in response to the end-of-message code sequence momentarily releasing relay UH which in turn releases relays EV and RC. Relay RC released, opens the path from the spacing contacts of relay L to the winding of relay LRP thus blinding relay LRP and, in turn, reperforator 11 to line signals.

As previously mentioned, one or more outlying stations including, for example, outlying station 7 are provided with a receiving-only teletypewriter such as teletypewriter 13 for printing any message when a call directing code sequence requiring answerback is not acknowledged. Assume now that a sending transmitter-distributor is provided with a message containing a first call directing code sequence requiring answerback, a second call directing code sequence not requiring answerback and a third call directing code sequence requiring answerback. When the transmitter-distributor is started the first call directing code sequence is sent and the transmitter-distributor pauses until the answerback is received. Thereupon the sending transmitter-distributor sends the second and third call directing code sequences pausing after the third call directing code sequence and then sending the end-of-address code sequence and text after the answerback to the third call directing code sequence is received.

The receipt of the first character A in the first call directing code sequence momentarily closes contacts 27 completing a path from ground through contacts 27, break contact of relay A and the winding of relay A to battery operating relay A which locks to ground by way of its own make contact and contacts 21. Relay A operated removes negative battery from the junction of resistors 53 and 55 whereupon capacitor 57 begins to charge from positive battery through the winding of relay P, break contact of relay P, resistor 55 and resistor 53.

Since, as previously described, relay L1 follows the signals on line 1, the impression of the second character of the first call directing sequence on line 1 momentarily closes the spacing make contact of relay L1 discharging capacitor 57 through resistor 53 and the spacing contact of relay L1.

After sending the second character the sending transmitter-distributor stops and awaits the answerback response. During the idle condition of line 1 the spacing contact of relay L1 is open and capacitor 57 again begins to charge.

When the answerback code character V is impressed on line 1, capacitor 57 is again discharged by way of the spacing contact of relay L1. In addition, the reception of the character V closes contacts 33 operating relay VL. Relay VL operated completes a discharge path for capacitor 57 through resistor 53 and the make contact of relay VL.

The sending transmitter-distributor now proceeds to send the second and third call directing code sequences. Each start element and each spacing element in each character of the second and third call directing code sequences momentarily completes the previously described discharge path for capacitor 57 through the spacing contact of relay L1. In addition, the reception of the first character of the second call directing code sequence reopens contacts 33 releasing relay VL which, in turn, opens the previously described discharge path for capacitor 57 by way of the make contact of relay VL.

After sending the third call directing code sequence the sending transmitter-distributor stops and awaits the answerback. With relay VL released and the line idle, capacitor 57 again begins to charge. In the event the answerback is not impressed on line 1 within approximately five seconds, charging capacitor 57 raises the voltage on the control electrode of gas tube 59 sufficiently to fire the tube. Tube 59 draws plate current from positive battery by way of the winding of relay P and the break contact of relay P. Relay P operates and locks by way of its own make contact and the break contact of relay PA.

Relay P operated opens the previously described plate circuit of tube 59 extinguishing the tube. In addition, relay P operates to complete a path from negative battery through the winding of relay PA, break contact of relay PA and the make contact of relay P to ground. Relay PA operates and locks through its own make contact and contacts 25. Relay PA operates to open the previously described operating path for relay VS and relay VS slowly releases. In addition, relay PA operated completes the operating path for relay SC which locks by way of its own make contact and the make contact of normally operated relay UH. Relay PA also operates to apply positive battery to lamp 61 energizing lamp 61 to indicate the interception of a message. The operation of relay SC maintains positive battery on lamp 61 through the make contact of relay UH and the make contact of relay SC. Relay PA also operates to open the previously described locking path for relay P and relay P releases.

Relay VS released opens the previously described discharge path for capacitor 47 whereby relay VG operates for the duration of two code elements and as previously described impresses the character V on line 1.

Returning now to relay SC, when relay SC is operated a path is completed from the spacing contact of relay L make contact of relay SC and the right-hand winding of relay LRO to ground operating relay LRO during each spacing signal from the line. As an energizing path is completed from positive battery through the winding of select magnet 63 of receiving-only teletypewriter 13 and the marking break contact of relay LRO to ground, teletypewriter 13 is unblinded to follow line signals.

When character V is impressed on party line 1 relay L1 follows the signals and discharges capacitor 57 in the same manner as previously described. In addition, contacts 33 close operating relay VL which in turn completes an additional discharge path for capacitor 57. The impression of the character V on line 1 also momentarily opens contacts 25 and relay PA releases. Relay PA released, recompletes the previously described operating path for relay VS and relay VS operates to complete the previously described discharge path for capacitor 47.

The sending transmitter-distributor now proceeds to send the end-of-address code sequence Carriage Return-Line Feed and the message text followed by the end-of-message code sequence Figures-H-Letters. The impression of the first character on line 1 by the sending transmitter-distributor reopens contacts 33 releasing relay VL which in turn opens one of the previously described discharge paths for capacitor 57. The reception of the code sequence Carriage Return-Line Feed momentarily opens contacts 21 releasing relay A. Relay A released, completes a discharge path for capacitor 57 through resistor 53 and the break contact of relay A. The reception of the end-of-message code sequence momentarily opens contacts 19 momentarily releasing relay UH. Relay UH while released opens the previously described energizing circuit for lamp 61 extinguishing the lamp and opens the previously described locking path for relay SC. Relay SC releases to open the previously described path from the spacing contact of relay L to the winding of relay LRO blinding relay LRO and thus blinding teletypewriter 13 to line signals.

Although a specific embodiment of this invention has been shown and described, it will be understood that various modifications may be made without departing from the spirit of this invention and within the scope of the appended claims.

What is claimed is:

1. In a telegraph system, a communication channel, a telegraph recorder selectable by selection code signals, a further recorder, means individual to said telegraph recorder and selectively responsive to the reception of said selection code signals from said channel for impressing an answerback code signal on said channel and connecting said telegraph recorder with said channel and further means responsive to said selection code signals and effective in the absence of the impression of said answerback signal on said channel for connecting said further recorder with said channel.

2. In a telegraph system, a communication channel, a plurality of telegraph recorders individually selectable by selection code signals, a further telegraph recorder, means individual to each of said plurality of recorders and selectively responsive to the reception of a selected one of said selection code signals from said channel for impressing an answerback code signal on said channel and connecting said selected recorder with said channel and timing means responsive to said selection code signals and effective in the absence of the impression of said answerback signal on said channel for connecting said further recorder with said channel.

3. In a telegraph system, a communication channel, a plurality of telegraph recorders individually selectable by selection code signals, a further telegraph recorder, means individual to each of said plurality of recorders and selectively responsive to the reception of a selected one of said selection code signals from said channel for impressing an answerback code signal on said channel and connecting said selected recorder with said channel and timing means responsive to said selection code signals and effective in the absence of the impression of said answerback code signal on said channel for impressing said answerback code signal on said channel and connecting said further recorder with said channel.

4. In a telegraph system, a communication channel, a plurality of telegraph recorders individually selectable by selection code signals, a further telegraph recorder, means individual to each of said plurality of recorders and selectively responsive to the reception of a selected one of said selection code signals from said channel for impressing an answerback code signal on said channel and connecting said selected recorder with said channel, a timing circuit effective in the absence of the impression of said answerback signal on said channel, means reponsive to the reception of said selection code signals for initiating the operation of said timing circuit and means responsive to the operation of said timing circuit at the end of the timing period thereof for connecting said further recorder with said channel.

5. In a telegraph system, a communication channel, a plurality of telegraph recorders individually selectable by selection code signals, a further telegraph recorder, means individual to each of said plurality of recorders and selectively responsive to the reception of a selected one of said selection code signals from said channel for impressing an answerback code signal on said channel and connecting said selected recorder with said channel, a timing circuit effective in the absence of the impression of said answerback signal on said channel, means responsive to the reception of said selection code signals for initiating the operation of said timing circuit and means responsive to the operation of said timing circuit at the end of the timing period thereof for impressing said answerback signal on said channel and connecting said further recorder with said channel.

6. In a telegraph system, a communication channel, a telegraph mechanism, means responsive to the reception of a predetermined signal from said channel for momentarily operating said mechanism, means responsive to the momentary operation of said mechanism for impressing a different signal on said channel and means responsive to the impression of said different signal on said channel for connecting said mechanism with said channel.

7. In a telegraph system, a communication channel, a telegraph recorder, means responsive to the reception of a predetermined code signal from said channel for momentarily operating said recorder, means responsive to the momentary operation of said recorder for impressing a different code signal on said channel and means responsive to the impression of said different code signal on said channel for connecting said recorder with said channel.

8. In a telegraph system, a communication channel, a telegraph recorder, selective means responsive to the impression of a predetermined selection code signal on said channel for momentarily operating said recorder, means jointly responsive to said selection signal and the momentary operation of said recorder for impressing an answerback code signal on said channel and means jointly responsive to said selection signal and the impression of said answerback signal on said channel for connecting said recorder with said channel.

9. In a telegraph system, a communication channel, a telegraph recorder, selective means responsive to the impression of a predetermined selection code signal on said channel for momentarily operating said recorder, operable means jointly responsive to said selection signal and the momentary operation of said recorder, signaling means responsive to the operation of said operable means for impressing an answerback code signal on said channel and further means jointly responsive to the operation of said operable means and the impression of said answerback signal on said channel for connecting said recorder with said channel.

References Cited in the file of this patent

UNITED STATES PATENTS

| | | |
|---|---|---|
| 1,939,613 | Watson | Dec. 12, 1933 |
| 1,960,360 | Watson | May 29, 1934 |